March 15, 1927. 1,621,378
T. H. REEDER
VEHICLE BRAKE
Filed April 14, 1924
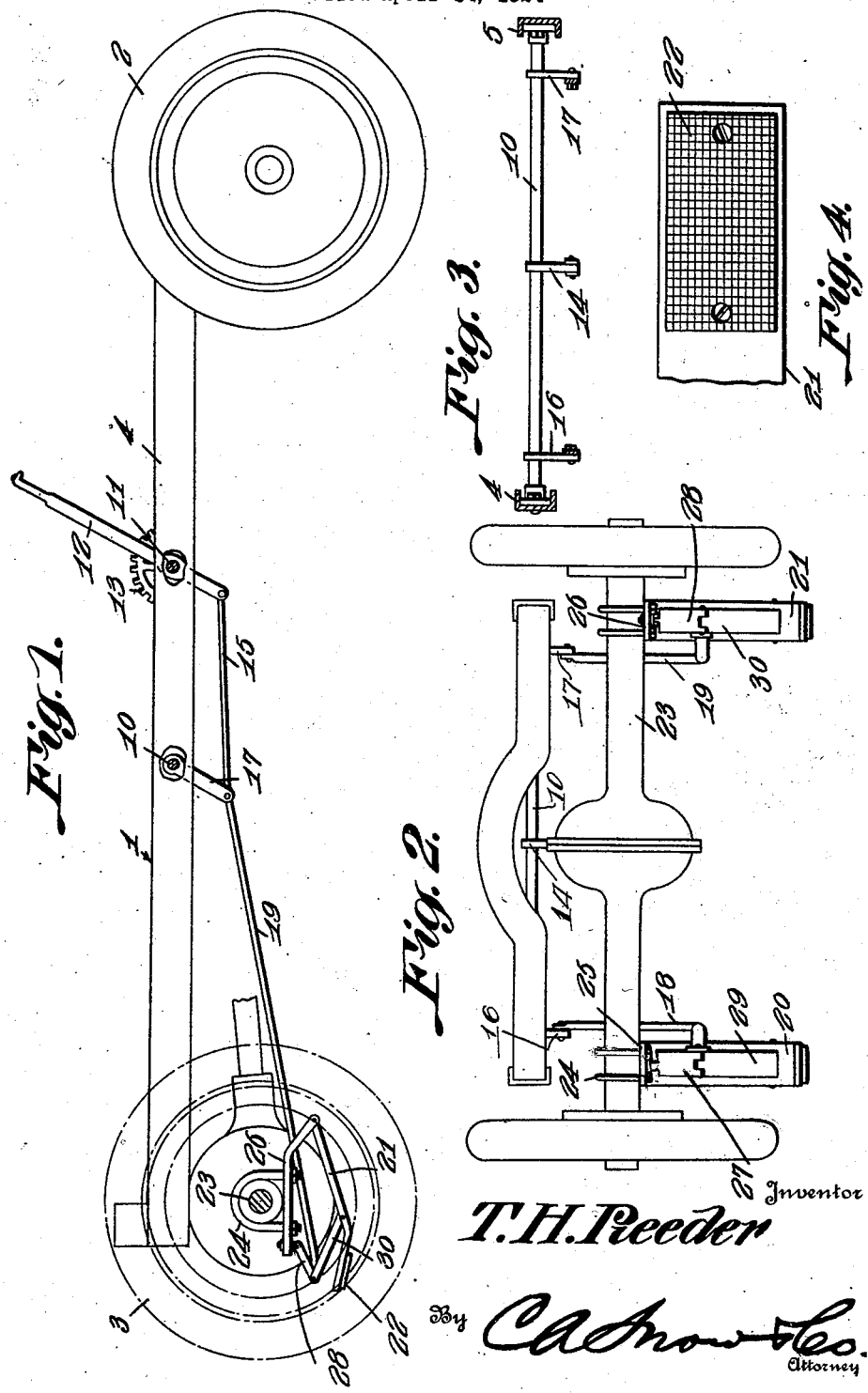

Patented Mar. 15, 1927.

1,621,378

UNITED STATES PATENT OFFICE.

THOMAS H. REEDER, OF GLENDIVE, MONTANA.

VEHICLE BRAKE.

Application filed April 14, 1924. Serial No. 706,450.

This invention relates to brakes for vehicles and more particularly to automobile brakes.

The object of the invention is to provide a brake of this character constructed so that it will operate as a brake or a jack at will.

Another object is to provide a brake which may be instantly applied without throwing the car into neutral or stopping the engine, and without any danger of skidding.

Another object of the invention is to provide an automobile brake constructed so as to operate directly on the road bed to retard the movements of the vehicle to which it is attached and which may be employed in locking the vehicle against movement when the latter is not in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation with parts broken out and in section of a vehicle frame with this improved brake shown applied.

Fig. 2 is a rear elevation thereof with the brake in operative position.

Fig. 3 is a transverse section taken on the line 3—3 of Fig. 1; and

Fig. 4 is a detail bottom plan view of one of the brake shoes.

In the embodiment illustrated the vehicle frame 1 is shown mounted on the usual front and rear wheels 2 and 3 and comprising side bars 4 and 5 braced and connected in the usual manner.

The brake constituting this invention includes transversely arranged rods 10 and 11 spaced longitudinally from each other and mounted in the side bars 4 and 5 of the frame. A brake operating lever 12 is fulcrumed intermediate its ends on the front rod 11 and is designed to be held in adjusted position by a toothed quadrant 13 mounted on the frame and is held by a pawl, not shown, carried by the lever 12, such as is ordinarily used in locking levers of this character.

An arm 14 is fixed to and depends from the rod 10 and its free end is connected with the lower end of lever 12 by a rod 15 to provide for the rocking of rod 10 when the lever 12 is actuated.

Two arms 16 and 17 are fixed to and depend from rod 10 on opposite sides of the arm 14 and spaced therefrom. A pair of rods 18 and 19 are pivotally connected at their front ends with the free ends of the arms 16 and 17 and extend rearwardly for connection with the brake shoes 20 and 21 which are exactly alike in construction the lower faces or gripping faces being preferably serrated as shown in Fig. 4 at 22.

Mounted on the rear axle 23 by U-shaped clamps 24 or otherwise are plates 25 and 26 arranged below the axle near opposite ends thereof inside the rear wheels 3. The brake shoes 20 and 21 which are preferably made in the form of obtuse angle plates are pivotally connected at their upper ends with the inner ends of the plates 25 and 26. The braking faces of these shoes shown at 22 are positioned so that they will engage the road bed when the shoes are lowered in a manner presently to be described.

Links 27 and 28 are pivotally connected with the outer ends of the plates 25 and 26 and depend therefrom and are pivotally connected at their lower ends with other links 29 and 30 which connect with the upper faces of the brake shoes 20 and 21 said links 29 and 30 being pivotally connected with said shoes.

The rods 18 and 19 have their rear ends outwardly offset and connected with the pivots which unite the links carried by the plates and the shoes so that the longitudinal movement of these rods will operate to raise and lower the shoes, the forward movement operating to lower the shoes and the rearward movement to lift them.

In the use of this brake shown in Fig. 1 with the brake shoes in raised position the rearward movement of lever 12 will operate to move rod 15 forward and rock shaft 10 causing the arms 16 and 17 to be moved rearwardly and the rods 18 and 19 connected therewith to be moved in the same direction. This forward movement of the rods 18 and 19 operate the toggle-like links which connect the shoes 20 and 21 with the plates 25 and 26 so that when said links are straightened out the shoes are forced downward into braking engagement with the road bed. This forcing of the brake shoes downward operates to raise the wheels 3 out of contact with the road bed so that they will spin around without touching the road and the brake shoes owing to their engagement with the road bed will instantly stop the vehicle without skidding. The brakes may be locked in adjusted position by engagement of the pawl on lever 12 with the toothed quadrant 13.

From the above description it will be obvious that these improved brake shoes may be used not only to stop the vehicle but as jacks for raising the wheels from the ground when desired for any purpose and that the parts may be locked in this position by the engagement of the pawl on the lever 12 with the quadrant 13.

This brake has only one rod for pulling the lever and thus obtains greater power with a less number of working parts. The construction shown and described includes a rod for each brake shoe eliminating the use of the rod directly beneath the differential. The pull exerted by the rod 15 on the brake lever affords a triple leverage thus rendering it comparatively easy to lift the weight of the vehicle.

The gripping faces 22 of the brake shoes are preferably made separable from the shoes proper so that they may be constructed of softer metal than the shoes and replaced when worn.

I claim:—

In combination with the rear axle and frame of a motor vehicle, a brake including substantially long plates secured to the axle and supported thereunder, each of said plates having a forwardly and downwardly extended end portion, a link pivotally connected with each plate at the opposite end thereof, a link pivotally connected with each of the first mentioned links, brake shoes having ground engaging portions and having one of their respective ends pivotally connected with the forwardly and downwardly extended ends of the plates, the last mentioned links being connected with the brake shoes at points adjacent to the opposite ends thereof, operating rods pivotally connected with the frame of the vehicle and having pivotal connection with the links at their points of pivotal connection for moving the ground engaging portions of the brake shoes to their active positions.

In testimony that I claim the foregoing as my own, I have hereto affixed my signature.

THOMAS H. REEDER.